J. WARD.
TOOL HOLDER.
APPLICATION FILED NOV. 14, 1908.

993,569.

Patented May 30, 1911.

Witnesses:
A. W. Fenstemaker
Carl H. Crawford

Inventor,
Josiah Ward.
By Glenn S. Noble
Att'y.

UNITED STATES PATENT OFFICE.

JOSIAH WARD, OF OAK PARK, ILLINOIS.

TOOL-HOLDER.

993,569.   Specification of Letters Patent.   Patented May 30, 1911.

Application filed November 14, 1908. Serial No. 462,683.

*To all whom it may concern:*

Be it known that I, JOSIAH WARD, a citizen of the United States, residing at Oak Park, in the county of Cook and State of Illinois, have invented certain new and useful Improvements in Tool-Holders, of which the following is a specification.

This invention relates more particularly to holders for cutting tools, such as lathe tools or the like, and is especially adapted to be used in connection with a tool post, such as ordinarily used on lathes. The tool-holders most commonly in use at the present time are usually provided with one or more screws for holding the tool while the holder itself is engaged by the clamping screw in the tool post.

One of the objects of this invention is to provide a tool-holder in which the tool will be clamped by the action of the tool-post screw, thereby doing away with the necessity of additional holding screws. These holding screws of the ordinary tool-holders are usually arranged adjacent to the cutting point of the tool, so that in turning metal the end of the cutting or ribbon from the stock is apt to strike the head of the screw and cause the same to buckle or break, thereby interfering with the smooth operation of the cutting tool. My improved holder overcomes this objection by allowing the cutting or ribbon to curl up without striking any such obstruction. A further objection to tool-holders having screws engaging with the stock is that, in engaging with the shank of the tool at one point only, they are apt to crack or break the same, particularly if the tool is made of modern hardened high-speed steel, which is apt to be more brittle in some portions than in others. This objection is overcome in my improved holder by having a long piece which engages with the upper side of the tool for a considerable distance and is therefore not apt to break the same. I accomplish these objects and advantages by means of the improved holder shown in the accompanying drawings, in which—

Figure 1:
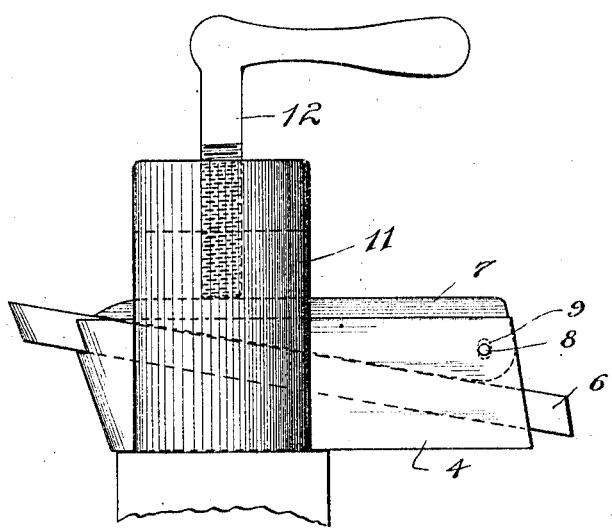
Figure 2:
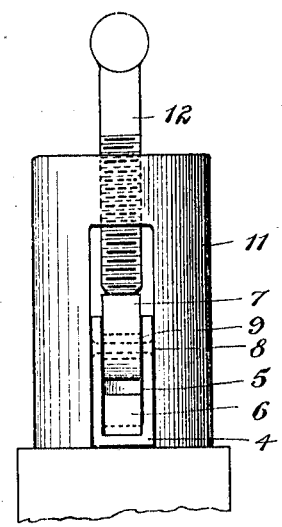

Figure 1 is a side view of a tool-holder embodying this invention, shown in position in a tool post; Fig. 2 is an end view of the same; and Fig. 3 is an enlarged sectional view of the holder.

As shown in these drawings, 4 represents the body portion of the holder, which is slotted as indicated at 5 to receive the tool 6 and also a clamping tongue or member 7. As indicated in these views, the bottom of the slot or recess 5 is preferably arranged at an acute angle to the lower edge of the holder in order to give a slant to the tool 6, but, of course, this slot may be arranged in any desired position. The tongue or clamping member 7 is pivoted at 8 to the body 4 of the holder, but is provided with a slotted or enlarged hole 9 to allow for more or less vertical movement of the tongue in order that it may adjust itself to varying sizes of the tools. The lower engaging edge 10 of the tongue 7 may be made straight, but I prefer to make it slightly concave, as indicated in Fig. 3, in order to insure the outer end engaging closely with the tool so that the tool will be held tightly adjacent to the working point. This curvature is preferably very slight, so that when the clamping screw is tightened, the lower edge will be substantially straight and in engagement with the tool for its entire length.

Figure 3:
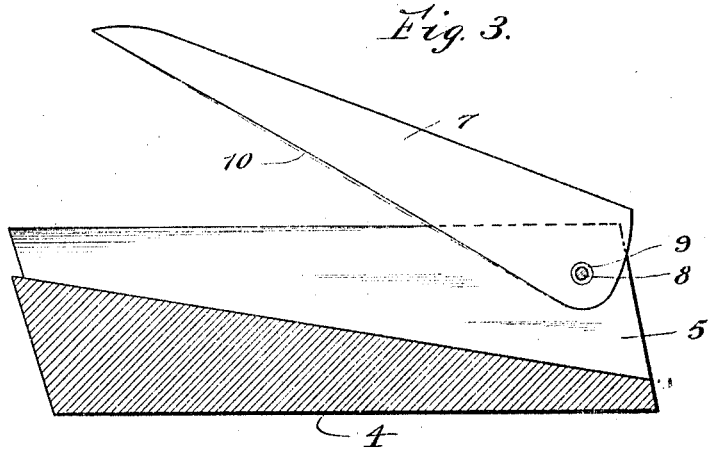

In order to use the tool-holder, the tongue 7 is raised, as indicated in Fig. 3, and the tool slipped in position in the slot 5, and the tongue is then swung down to engage with the top of the tool. The holder is then placed in the tool post or other holding device, as indicated at 11, and the clamping screw 12 screwed down to engage with the tongue 7. This will firmly clamp the tongue into engagement with the tool and at the same time hold the tool-holder securely in position.

Although I have described the holder as particularly adapted for lathes, it may of course be used with other machines, such as planers or the like, and various modifications may also suggest themselves as coming within the scope of my invention, and therefore I do not wish to be limited to the exact construction shown and described except as required by the scope of the appended claims; but

What I claim and desire to secure by Letters Patent is:

1. In a tool holder, the combination of a body portion having a longitudinal slot in one side thereof extending through to the ends of said body portion and adapted to receive a tool, with a tongue pivotally secured to said body portion in said slot and adapted to have its side opposed to the bottom of the slot engage longitudinally with the tool and the opposite side engaged by the set-screw of a tool post, the arrangement being such that tools of greater length than the holder may be inserted therein and clamped by means of said tongue.

2. In a tool-holder of the character set forth, the combination of a body portion having a slot therein for receiving the tool, and a clamping member having a slightly concaved side for engagement with the tool, said clamping member being loosely pivoted in said slot so that it will be free to engage with tools of varying widths.

3. In a tool-holder, the combination of a body portion adapted to engage with the slot of a tool post, said body portion having a groove in the upper edge to receive a tool; a clamping tongue engaging with said groove, said tongue having a hole through one end; and a pivot engaging with said body portion and passing through said hole, said pivot being smaller than the hole; the arrangement being such that when the tool-post screw engages with said tongue, it will press the latter against the tool to hold the same and will also hold the tool-holder rigidly in the post.

JOSIAH WARD.

Witnesses:
A. W. FENSTEMAKER,
CARL H. CRAWFORD.